United States Patent [19]
Cassin

[11] Patent Number: 5,267,612
[45] Date of Patent: Dec. 7, 1993

[54] FRICTION PLUG FOR A HIGH PRESSURE PIPE

[76] Inventor: Allen E. Cassin, 1750 Day Dr., St. Clair, Mo. 63077

[21] Appl. No.: 863,817

[22] Filed: Apr. 6, 1992

[51] Int. Cl.⁵ .............................................. E21B 33/02
[52] U.S. Cl. ...................................... 166/86; 166/97; 166/192; 138/89
[58] Field of Search ................ 166/97, 86, 88, 209, 166/179, 192; 138/89

[56] References Cited

U.S. PATENT DOCUMENTS

| | | |
|---|---|---|
| 1,506,881 | 9/1924 | Broberg . |
| 4,201,267 | 5/1980 | Ramhorst .................. 166/86 X |
| 4,250,928 | 2/1981 | Nishikawa ................. 138/113 |
| 4,465,133 | 8/1984 | Bridges ..................... 166/208 |
| 4,498,534 | 2/1985 | Lindsey ..................... 166/208 |
| 4,619,326 | 10/1986 | van Mierlo ................ 166/382 |
| 4,691,740 | 9/1987 | Suetlik et al. ............. 138/109 |
| 4,723,578 | 2/1988 | Mordarski et al. ........ 138/89 X |
| 4,771,810 | 9/1988 | Ermold et al. ............. 138/89 |
| 4,862,961 | 9/1989 | Neff ........................... 166/127 |
| 4,942,924 | 7/1950 | Duncan ...................... 166/290 |
| 4,982,763 | 1/1991 | Klahn ......................... 138/89 X |

Primary Examiner—Terry Lee Melius
Attorney, Agent, or Firm—Polster, Lieder, Woodruff & Lucchesi

[57] ABSTRACT

A well-head (W) having a casing (C) through which a fluid flows. Apparatus (10) for controlling the flow of fluid has an output shaft (14) insertable into a sleeve (18), sleeve (18) being insertable into the casing at its fluid outlet end (E). The sleeve extends from a hub (12) which is placeable into the outlet end of the casing and extends down into the casing. The output/draw shaft (14) extends up through the sleeve, and has a draw nut (34) and a shut-off valve (16). The valve (16) allows fluid flow through the output/draw shaft during installation of the sleeve but shuts off flow thereafter. The sleeve has a circular wall (22), defining a longitudinal bore (24) having an inner diameter (D1) which gradually increases from the upper to the lower end of the sleeve. Circular wall (22) thus has a tapering thickness along the length of the sleeve. The output/draw shaft (14) is inserted up through the sleeve and has a tapered external diameter corresponding to the internal taper of the sleeve. The output/draw shaft is drawn upward inside the sleeve, by tightening the draw nut, thereby forcing the wall of the sleeve to expand outwardly and adhere to the inside of the casing.

31 Claims, 2 Drawing Sheets

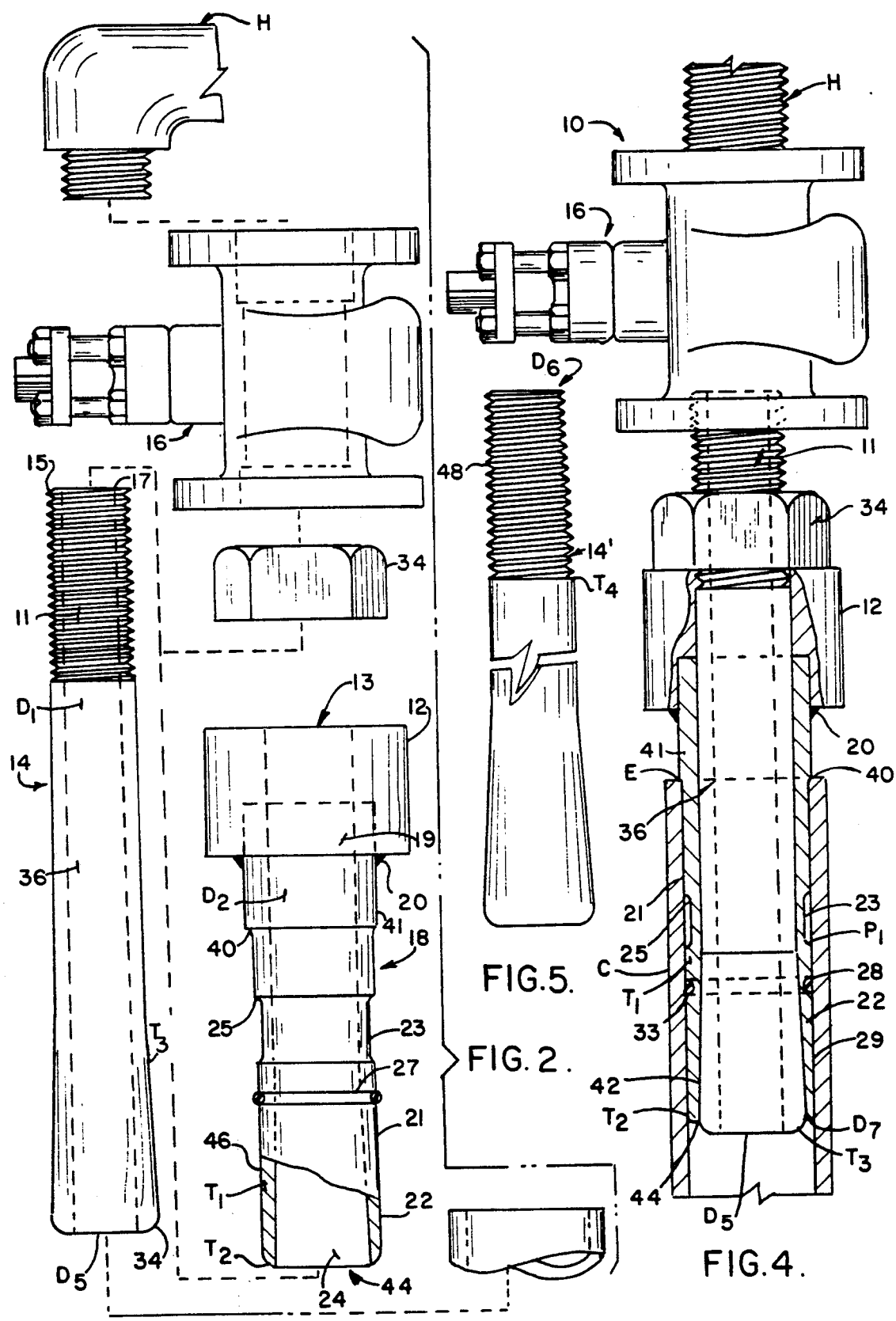

5,267,612

FRICTION PLUG FOR A HIGH PRESSURE PIPE

BACKGROUND OF THE INVENTION

This invention relates to a plug for plugging the open end of a pipe; and in particular, a friction plug for plugging the outflow end of a high pressure pipe such as, for example, an oil well-head casing, a gas pipe or a high pressure water well casing.

Long sections of pipe are commonly used to access pockets of crude oil, natural gas, water or the like deep within the earth. Extensive drilling and the installation of sections of piping or casing are required to reach down into the earth and tap into a pocket of oil, for example. This process of drilling and adding pipe for casing is labor intensive and expensive. Many hundreds, or often thousands of feet of pipe or casing are required in the process.

Oil, for example, being deep in the earth, flows back up through the casing with tremendous force. The entire system of casing, well-head and rigging is under high pressure. Therefore, if the integrity of the casing is damaged by disassembly, rupture, or fire, it is quite difficult to repair or plug the high pressure casing or pipe. In most cases the casing is simply plugged by pouring a sealant, known in the industry as "mud", into the outflow end of the casing. The "mud" packs and forms an impervious plug inside the casing. This is an unsatisfactory solution to the problem since this plugging with "mud" renders the pipe useless. If there is an adequate reserve of oil, for example, in the pocket, the existing access pipe must be abandoned and a new access pipe drilled and new casing or pipe installed next to the plugged casing or pipe. This procedure is performed at considerable expense. The present invention, both recognizing and resolving these problems associated with plugging a high pressure pipe provides a unique and novel system for both plugging the pipe, yet allowing continued use of the existing pipe to access fluid or gas, thereby saving time, energy and the associated cost with permanently plugging an existing high pressure pipe, drilling a new access, and installing a new pipe or casing next to the plugged pipe.

SUMMARY OF THE INVENTION

It is, therefore, among the several objects of the present invention, to provide a friction plug for plugging the outflow end of a high pressure pipe or a lower pressure pipe.

Another object of the invention is to provide a friction plug comprising a sleeve insertable into the end of the pipe, the sleeve having a tapered internal bore, and an output/draw shaft insertable into the sleeve. The output/draw shaft has a tapered external diameter that corresponds to the tapered internal diameter of the sleeve. The output/draw shaft is drawn up through the sleeve, the taper of the output/draw shaft forcing the walls of the sleeve to expand and adhere to the inside of the pipe.

A further object of this invention is to provide a friction plug manufactured out of material sufficiently ductile to allow the expansion of the sleeve wall under the force of pressure of the upward moving output/draw shaft.

A still further object of this invention is to provide a friction plug having an associated valve mechanism openable to allow flow of fluid through the plug during its installation but which is thereafter closed to shut off of the flow of fluid after installation.

Yet another object of this invention is to provide a mechanism that allows re-opening of the plug after the insertion and seating of the plug for the outflow of fluid through the existing pipe or casing to be resumed.

Another object of this invention is to eliminate the need for permanently plugging a high pressure pipe such as an oil well casing and drilling a new replacement well.

Still another object of this invention is to provide a piping or hose mechanism by which the fluid outflow through the friction plug can be inexpensively and usefully diverted away from the device.

Another object of this invention is to provide a solid friction plug which completely stops fluid flow through the plug mechanism.

Yet another object of the present invention is to provide a friction plug that is simple and easy to construct, utilizes a minimum number of moving parts, is economical, requires little or no maintenance, and is well adapted for the purposes intended.

In accordance with the invention, generally stated, a friction plug for a high pressure pipe or low pressure pipe includes a sleeve with an internal taper. An output/draw shaft is insertable into the sleeve and has an external taper corresponding to the internal taper of the sleeve. The sleeve and output/draw shaft assembly are insertable into the end of the high pressure pipe or casing, the sleeve expanding when the output/draw shaft is drawn up in the sleeve. A hub is adaptable to allow installation of the plug in the pipe or casing using standard industry equipment. The output/draw shaft has an internal longitudinal bore which allows outflow of fluid. Or, it can be solid to permanently plug outflow of fluid. A valve, on one end of the output/draw shaft, is openable to allow outflow of fluid during installation, and is thereafter closed to shut off the outflow of fluid. The closure creates sufficient fluid force against the shutoff valve to force the output/draw shaft up inside the sleeve thereby causing the sleeve walls to expand outwardly against the interior face of the pipe or casing walls. This secures the friction plug in place in the pipe. The output/draw shaft can be further drawn up inside the sleeve to further expand the sleeve by tightening a draw nut on the upper external portion of the output/draw shaft.

Other objects and features will be in part apparent, and in part pointed out hereinafter in light of the foregoing description and accompanying drawings.

BRIEF DESCRIPTION OF THE DRAWINGS

FIG. 2 is an exploded view, partially in section, of the components of the friction plug of the current invention prior to assembly;

FIG. 4 is a view similar to FIG. 3, partially in section, but with the plug secured to the interior casing wall, the output/draw shaft being drawn up tightly inside the sleeve, forcing the sleeve walls outwardly against the interior facing of the casing; and FIG. 5 illustrates an alternative embodiment of the invention, wherein the outflow shaft is a solid plug with no internal longitudinal bore.

DESCRIPTION OF THE PREFERRED EMBODIMENT

Figure 1:
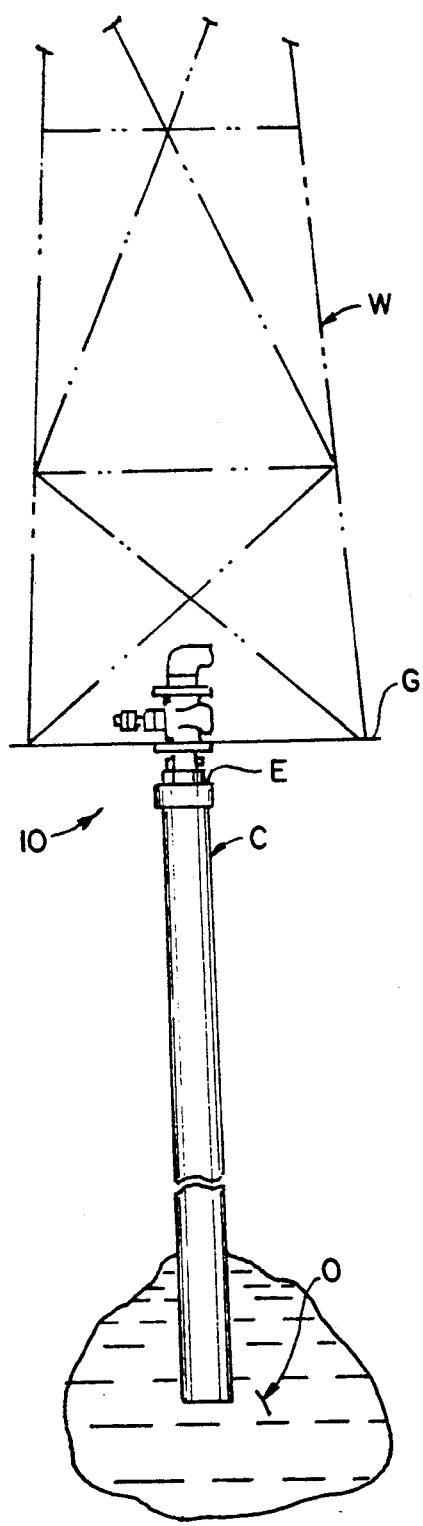
FIG. 1 is a front elevational view of a well-head assembly with the well-head casing extending downwardly through the ground and penetrating a pool of oil with the present invention mounted on the output end of the casing.
Figure 3:
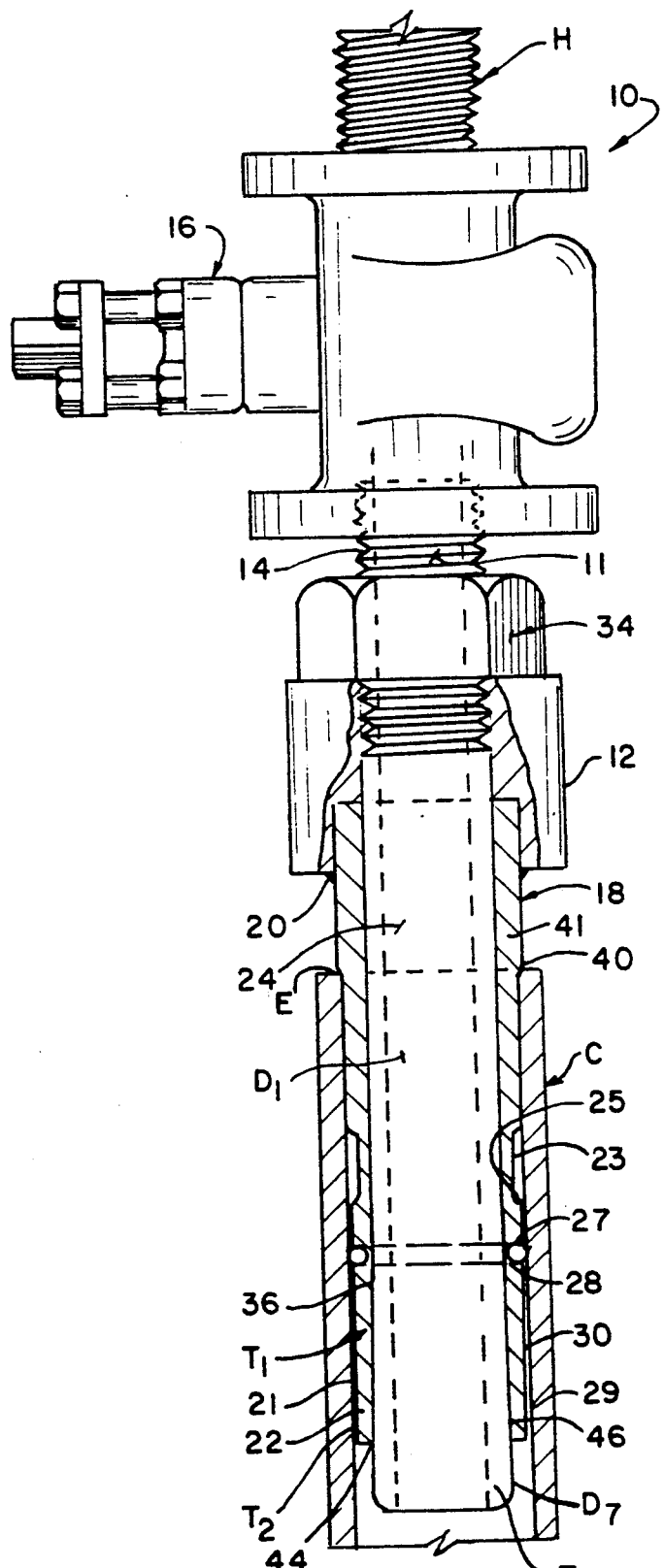
FIG. 3 is an installed view, partially in section, of the invention after insertion in the output end of a casing, and with a shut-off valve closed, before the output/draw shaft is drawn up tightly into the sleeve.

Referring to the drawings, FIG. 1 illustrates a well-head assembly W having a well-head casing C extending downwardly through the ground G and penetrating a pool of oil O. The pool may be many hundreds of feet below the surface of the ground G. As best seen in FIG. 3, a friction plug of the present invention is indicated generally 10 and is constructed for the use in output end E of casing C. Plug 10 has a hub 12 made generally from regular shafting type steel, for installing the plug into the output end of the well casing. Hub 12 can be adapted to accept machinery (not shown) for installation in a pipe. For example, machinery known in the oil well drilling industry can be used to insert assembly 10 into casing C. The friction plug is mounted to well casing C with exposed hub 12, an output/draw shaft 14, generally made from high tensile strength steel, a shut-off valve 16, an optional flex-steel hose H or pipe (not shown) extending out of the output end of the casing. Sleeve 18, also generally made from ductile, malleable steel, extends downwardly into casing C. Sleeve 18 fits into a sleeve nest 19 counterbored in hub 12. The hub is further secured to sleeve 18 by a strip weld 20 which extends around the outer diameter of sleeve 18 at its upper end, the weld being at a point where the sleeve protrudes downwardly from the hub. The major diameter D2 of shaft 18 will be slightly undersize of the casing C that is to be plugged to allow for minimal clearance 30 between sleeve wall 22 and internal face 29 of casing C. Clearance 30 should be limited to a space that can be closed by walls 22 expanding approximately 0.070 inch (0.178 cm) for each 1 inch (2.54 cm) of upward vertical movement of shaft 14 inside sleeve 18. The overall length of sleeve 18 is approximately three (3) times the internal diameter of the casing (C) in which it is to be installed. Output shaft 14 is inserted up through sleeve 18, through the opening in hub 12, and is drawn up into the sleeve 18 by a draw nut 34.

An internal annular opening 13 of hub 12 (see FIG. 2) is of sufficient diameter to allow clearance of output/-draw shaft 14. The upper portion of shaft 14 has appropriate-type machine threading 15 of a sufficient length for the application of draw nut 34 and the attachment of shut off valve 16. Threaded portion 15 extends upwardly an appropriate length sufficient so a flex steel hose H or piping (not shown) can be attached. Output shaft 14 has an outer diameter D1 that increases from the top to the bottom as to allow the output/draw shaft to fit securely within sleeve 18 when assembled.

Output/draw shaft walls 36 define an internal longitudinal bore 11 with a concentric diameter. Outside diameter D1 of shaft 14 increases from the top to bottom of the shaft, thereby forming outer wall 36 that tapers in increasing thickness from top to bottom. Shaft 14 is insertable into sleeve 18 up through bottom opening 44 of sleeve 18 prior to insertion of assembly 10 into casing C. Shaft 14 has a wall thickness at its upper concentric end which is at least two (2) times that of the thickest part of sleeve 18 at taper T1. The length of output/draw shaft 14 external taper T3 is determined by its diameter D5 at its base. The taper of T3 is approximately 1.5 degrees and extends an appropriate length at 1.5 degrees to result in diameter D5 of the same diameter as outside diameter D7 of sleeve 18 at its base. This causes shaft 14 to extend beyond sleeve 18, at opening 44, prior to the tightening of the draw nut 34 (see FIG. 3), and assures greater contact between shaft 14 and internal face 46 of the sleeve as shaft 14 is drawn up into sleeve 18. The upper portion of shaft 14 is smaller in diameter than the internal diameter of longitudinal bore 24 of sleeve 1 to allow clearance of shaft 14 when shaft 14 is inserted up through sleeve 18.

The overall length of the shaft 14 depends upon the length of shaft needed to extend upward through hub 12, so as to accommodate draw nut 34, valve 16 and piping P or hose H. Shaft 14 has external threads 15 extending upward from a point below its entry into hub 12, threads 15 extending a length appropriate to accomodate draw nut 34, and varying in length relative to the length of taper T3 of shaft 14 that is to be drawn up through sleeve 18. The longer taper T3 the longer threads 15 must be for draw nut 34 to pull shaft 14 up through sleeve 18. Draw nut 34 is tightened, thereby drawing output/draw shaft 14 up through sleeve 18 and through hub 12. After sleeve 18 is inserted into casing C, the process of tightening draw nut 34 is continued thereby drawing shaft 14 further up through sleeve 18. This upward movement of output/draw shaft 14 forces a circular wall 22 of sleeve 18 to expand against interior face 29 of casing C, thereby securing apparatus 10 in place. As stated before, walls 22 generally expand 0.070 inch (0.178 cm) for each 1 inch (2.54 cm) of upward mount of shaft 14.

FIG. 3 illustrates a friction plug of the present invention inserted into a casing prior to the expansion of sleeve 18. Apparatus 10 is inserted into output end E at shoulder 40 of major diameter 41, with sleeve 18 extending downwardly into the casing. Shoulder 40 serves as a seat for sleeve 18 on output end E and serves to deflect any oil or fluid spewing out of end E during installation so that the spewing oil or fluid does not deflect off hub 12 and the attached assembly equiptment (not shown). Sleeve 18 has a circular wall 22 defining longitudinal bore 24, the thickness of circular wall 22 of the sleeve 18 at its major thickness is approximately 10% of internal diameter of casing C in which sleeve 18 is inserted up to a maximum of 0.300 of an inch. Inner diameter of sleeve 18 increases along the length of longitudinal bore 24 forming taper T1 of approximately 1.5 degrees in circular wall 22 and a decrease in wall thickness T2 at the lower end of sleeve 18. Taper T1 reduces the circular wall thickness T2 by approximately 60% at the lower end of sleeve 18. Sleeve wall 22 has machined relief 23 of reduced material thickness extending upwardly from point P1 on outer face 21 of sleeve 18 parallel to a location on the inner face of wall 22 where taper T1 begins. Machined relief 23 extends upwardly a length approximately one-third ($\frac{1}{3}$) of the overall length of taper T1 and is machined to a depth of one-third ($\frac{1}{3}$) of the thickness of sleeve wall 22 at point P1 where taper T1 begins and to a maximum depth of approximately one-half ($\frac{1}{2}$) the thickness of wall 22 at its thickest point, for example, at the thickness of wall 22 where wall 22 abuts hub 12. Machined relief 23 forms pivot point 25 in circular sleeve wall 22 which allows wall 22 to expand outwardly. Outer face 21 of sleeve 18 contains annular groove 27 to seat seal means 28. There is minimal clearance 30 between outer face 21 of sleeve wall 22 and interior face 29 of casing C, so that sleeve 18 is insertable into casing C. Shaft 14 is drawable up into sleeve 18 by draw nut 34, to expand sleeve wall 22 outwardly from pivot point 25.

FIG. 4 illustrates the relationship of sleeve 18 to casing C after installation, under the force of pressure from the upwardly moving output/draw shaft 14. After installation of apparatus 10, shut off valve 16 is closed, stopping flow of fluid through bore 11 of output/draw shaft 14, the shut-off of flow creating a fluid force against closed valve 16 mounted on output/draw shaft 14 forcing output/draw shaft 14 upwardly inside sleeve 18 in a piston-like manner. The movement of output/draw shaft 14 upwardly inside sleeve 18 causes circular sleeve wall 22 to expand outwardly against interior face 29 of casing C, and eliminate the minimal clearance 30 (See FIG. 3) between sleeve wall 22 and interior face 29 of the casing. Seal 28 is flattened against interior face 29 of casing C, forming sealed area 33. Sleeve 18 seizes against interior face 29 of the casing. Draw nut 34 is tightened drawing output/draw shaft 14 further up inside sleeve 18 causing further expansion of sleeve wall 22 forcing sleeve wall 22 to seize tighter against the interior face 29 of the casing.

In an alternative embodiment (see FIG. 5) an output/draw shaft 14' is solid with no internal longitudinal bore. The length of a shank 48 above a taper T4 can be approximately one-third (⅓) the length of the sleeve 18 above the point where its internal taper T1 begins. This allows shaft 14' to be drawn up through sleeve 18 so shaft 14' does not bottom out against hub 12. Shank 48 can be a smaller diameter D6 than the diameter of shaft 14' at T4, but should be no less than one-third (⅓) the diameter of shaft 14', where shaft 14' meets shank 48.

It should be noted that the description of this device for plugging an oil well casing is for illustrative purposes and not intended to narrow the scope of the invention. The invention could be used to plug an oil well casing, a gas pipe, water pipe or any other tubular structure.

Numerous variations, within the scope of the appended claims, will be apparent to those skilled in the art in light of the foregoing description and accompanying drawings.

Having thus described the invention, what is claimed and desired to be secured by Letters Patent is:

1. In a well-head having a casing through which fluid is flowing, apparatus for controlling the flow of fluid comprising:
    sleeve means insertable into the casing at the fluid outlet end thereof;
    an output/draw shaft insertable up through the sleeve means;
    hub means on which the sleeve means is installed, the hub means being placeable over the outlet end of the sleeve with the sleeve means extending from the hub means into the casing; and,
    valve means for controlling flow of fluid from the casing during installation of the sleeve means in the end thereof, the valve means allowing flow of fluid through the outlet end of the casing during installation of the sleeve means, but shutting off flow therethrough after the installation is made, wherein the output/draw shaft means defines a longitudinal bore through which the fluid passes when the sleeve means is installed in the casing, the wall of the output/draw shaft having a uniform inner diameter and an outer diameter that gradually increases from the upper end to the lower end thereof whereby the wall thickness tapers along the length of the output/draw shaft, the sleeve means includes a circular wall defining a longitudinal bore through which the output/draw shaft is drawn, the wall of the sleeve means having an inner diameter which gradually increases from the upper end to the lower end whereby the taper of the longitudinal bore of the sleeve corresponds to the taper of the external diameter of the output/draw shaft, whereby the force exerted as the output/draw shaft moves upwardly inside the sleeve forces the wall of the sleeve outward and to be forced against the inner inside wall of the casing in which the sleeve is inserted and seat the apparatus in place.

2. The apparatus of claim 1 wherein the output/draw shaft is made of high tensile strength steel.

3. The apparatus of claim 1 wherein the outer face of the sleeve means wall has a machined relief extending upwardly from a point on the outer face of the sleeve means parallel to the location on the inner face thereof where the inner diameter begins to increase in diameter, the machined relief on the outer face of the sleeve means forming a pivot whereby the circular walls of the sleeve means can expand when the upwardly moving output/draw shaft exerts force within the inner face of the sleeve wall.

4. The apparatus of claim 3 wherein the machined relief extends a length approximately one-third (⅓) of the overall length of the taper of sleeve means.

5. The apparatus of claim 3 wherein the machined relief in the outer face of the sleeve is of a reduced material thickness which is approximately one-half the thickness of the sleeve wall at its thickest point.

6. The apparatus of claim 5 wherein an annular groove is formed intermediate the machined relief and a base of the sleeve means, the apparatus further including seal means seated in the groove for sealing between the sleeve and casing.

7. The apparatus of claim 1 wherein the overall length of the sleeve is approximately three times the internal diameter of the casing in which it is to be installed.

8. The apparatus of claim 1 wherein the thickness of the circular wall of the sleeve means at the taper is approximately 10% of the internal diameter of the casing in which the sleeve means is inserted up to a maximum of 0.300 of an inch.

9. The apparatus of claim 3 wherein the taper angle reduces the circular wall thickness by approximately 60% at the lower end of the sleeve means.

10. The apparatus of claim 9 wherein the increase in the inner diameter of the wall forms approximately a 1.5 degree taper in the thickness of the circular wall.

11. The apparatus of claim 1 wherein the ductility of the sleeve means alters the degree of taper angle and the wall thickness.

12. The apparatus of claim 1 wherein the hub means comprises means for connecting to equipment used in installing the sleeve means.

13. The apparatus of claim 12 wherein the length of the hub means is variable depending upon the type of equipment used to install the sleeve means.

14. The apparatus of claim 13 wherein the overall length of the hub means exceeds at least one-fourth the overall length of the sleeve means.

15. The apparatus of claim 13 wherein the hub means further includes means for connecting fasteners to the hub means to facilitate connection of the mounting equipment to the hub means.

16. The apparatus of claim 13 wherein the thickness of the circular wall of the hub means is no less than the thickness of the upper end of the circular wall of the sleeve means.

17. The apparatus of claim 16 wherein the outer diameter of the hub is no less than that diameter that will allow for a circular wall thickness no less than the thickness of the upper end of the circular wall of the sleeve means.

18. The apparatus of claim 17 wherein the annular opening in the hub comprises a counter bore whereby the sleeve means can be inserted into the hub means.

19. The apparatus of claim 17 wherein the depth of the counter bore is at least ½ the overall length of the hub means.

20. The apparatus of claim 17 wherein the annular opening in the hub is of such a diameter to allow clearance of the draw shaft.

21. The apparatus of claim 1 wherein the hub is strip weldable to the sleeve.

22. The apparatus of claim 1 wherein the output/draw shaft comprises a cylindrical wall defining a longitudinal bore which is of uniform diameter throughout its length.

23. The apparatus of claim 22 wherein the outer diameter of the cylinder wall of the output/draw shaft increases in diameter from top to bottom thereby forming a taper corresponding to the taper of the internal bore of the sleeve means.

24. The apparatus of claim 23 wherein the cylindrical wall of the output/draw shaft has a wall thickness at its upper end which is approximately two (2) times the thickness of the thickest part of the wall thickness of the sleeve.

25. The apparatus of claim 23 wherein the length of the taper of the cylindrical wall of the output/draw shaft is determined by the outside diameter at the base of the output/draw shaft, said output diameter at the base of the output/draw shaft being the same as the outside diameter at the base of the sleeve.

26. The apparatus of claim 25 wherein the taper of the outside wall of the output/draw shaft is at approximately 1.5 degree angle, and corresponds to the taper of the cylindrical bore in the sleeve into which the output/draw shaft is inserted.

27. The apparatus of claim 22 wherein the output/draw shaft has a threaded upper outer surface by which output/draw shaft is drawn up through the sleeve by a draw nut causing said sleeve to expand against the interior wall of the casing.

28. The apparatus of claim 22 wherein the output/draw shaft comprises means for attaching a pipe to the output/draw shaft for discharge of fluid during and after installation of the sleeve into the casing.

29. The apparatus of claim 22 wherein the output/draw shaft further comprises means for attachment of a shut-off valve thereto for control of flow of fluid through the apparatus.

30. In an oil well having a well-head including a casing through which oil and gas flow, apparatus for controlling flow of the oil and gas through the wellhead comprising:

sleeve means insertable into the casing at the fluid outlet end thereof;

an output/draw shaft insertable up through the sleeve means;

hub means on which the sleeve means is installed, the hub means being placable over the outlet end of the well head casing with the sleeve means extending from the hub means into the casing; and, valve means for controlling flow of fluid from the casing during installation of the sleeve means in the end thereof, the valve means allowing flow of fluid through the outlet end of the casing during installation of the sleeve means, but shutting off flow therethrough after the installation is made, wherein the output/draw shaft includes a circular wall defining a longitudinal bore through which the fluid can pass when the sleeve means is installed in the casing, the wall of the output/draw shaft having a uniform inner diameter with an outer diameter that gradually increases from the upper end to the lower end thereof whereby the wall thickness tapers along the length of the output/draw shaft, the sleeve means including a circular wall defining a longitudinal bore through which the output/draw shaft is drawn, the wall of the sleeve means having an inner diameter which gradually increases from the upper end to the lower end whereby the taper of the longitudinal bore of the sleeve corresponds to the taper of the external diameter of the output/draw shaft, whereby the force exerted as the output/draw shaft moves upwardly inside the sleeve forces the wall of the sleeve outwardly for the outer face thereof to be forced against the inner side wall of the casing and seat the apparatus in place.

31. In a well-head having a casing through which fluid is flowing, an apparatus for stopping the flow of fluid comprising:

sleeve means insertable into the casing at the fluid outlet end thereof;

hub means on which the sleeve means is installed, the hub means being placeable over the outlet end of the sleeve with the sleeve means extending from the hub means into the casing; and a draw shaft insertable up through the sleeve means, the draw shaft comprising a solid plug defined by a solid wall, the wall of the draw shaft having an outer diameter that gradually increases from an upper end to a lower end thereof, the sleeve means including a circular wall defining a longitudinal bore through which the draw shaft is drawn, the wall of the sleeve having an inner diameter which gradually increases from an upper end through a lower end corresponding to the outer diameter of the draw shaft, whereby the force exerted as the draw shaft moves upwardly inside the sleeve forces the wall of the sleeve outward and to be forced against the inner inside wall of the casing in which the sleeve is inserted and seat the apparatus in place.

* * * * *